United States Patent Office 3,095,013
Patented June 25, 1963

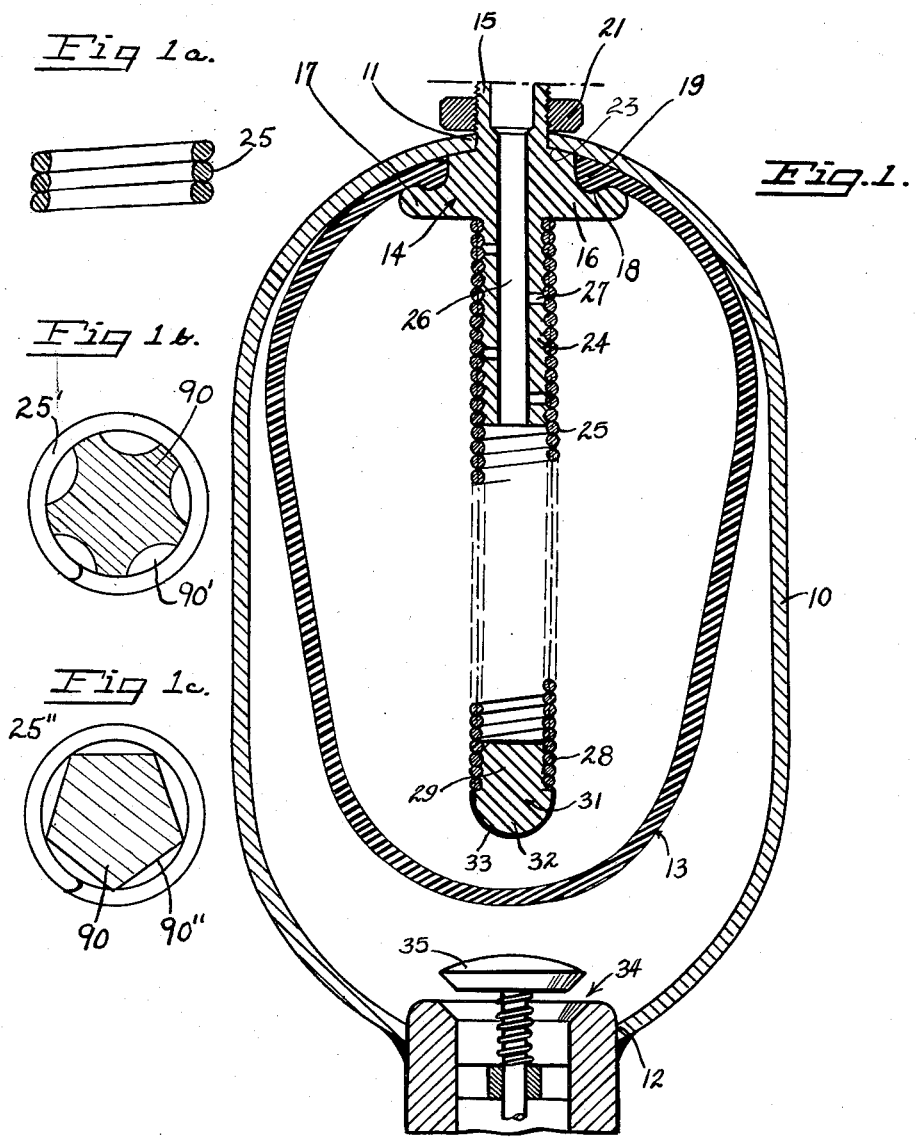

3,095,013
PRESSURE VESSELS
Jean Mercier, 1185 Park Ave., New York, N.Y.
Filed Apr. 30, 1959, Ser. No. 810,165
Claims priority, application France July 30, 1958
6 Claims. (Cl. 138—30)

This invention relates to the art of pressure vessels more particularly of the type having a deformable partition therein.

As conducive to an understanding of the invention, it is noted that where such pressure vessels are of a large size and the partition is an elongated bladder or sleeve, between the two fluids under pressure contained therein, which is compressed during operation, it is likely to rub against the side wall of the vessel with possibility of rupture of the bladder or sleeve and failure of the pressure vessel. In addition when such elongated bladder or sleeve is compressed, it may form a sharp fold which is also likely to cause rupture.

It is accordingly among the objects of the invention to provide a pressure vessel of the above type in which the deformable partition therein is precluded from rubbing against the side wall of the container and is not likely to form sharp folds, thereby preventing rupture of said bladder with resultant failure of the unit.

According to the invention these objects are accomplished by the arrangement and combination of elements hereinafter described and particularly recited in the claims.

This application is a continuation-in-part of copending application Serial No. 494,139, filed March 14, 1955, now Patent No. 2,947,326, granted August 2, 1960.

In the accompanying drawings in which are shown one or more of various possible embodiments of the several features of the invention, FIG. 1 is a longitudinal sectional view of an embodiment of the invention, FIG. 1a is a fragmentary sectional view of the coil spring, and FIGS. 1b and 1c are fragmentary sectional views of other embodiments of the guide member.

Referring now to the drawings, as shown in FIG. 1, the pressure vessel comprises a container 10 of strong rigid material such as steel, cast aluminum or the like, capable of withstanding high pressure and having a pair of ports 11 and 12 preferably axially aligned at opposed ends of the container.

The container 10 may be spherical or cylindro-spherical as shown and has a partition 13 therein intervening between said ports 11 and 12, defining a variable volume chamber on each side. The partition 13 preferably is a collapsible and expansible bladder of resilient material such as rubber or synthetic plastic of like physical characteristics, which in distended but substantially unstretched condition is smaller than the cavity of the container 10 and has its longitudinal axis aligned with the ports 11 and 12.

The bladder 13 is securely affixed in the container 10 preferably by means of a fitting 14 which desirably has a substantially cylindrical stem portion 15 with a base disc 16 presenting an outstanding lateral flange 17 which desirably has an annular groove 18 in its upper face in which may be positioned the thickened rim 19 about the mouth of the bladder 13.

Thus with the stem portion 15 positioned in port 11 and protruding beyond the latter, when a nut 21 screwed on the protruding portion of stem 15 is tightened, the rim 19 of the bladder 13 will be clamped between flange 17 and the adjacent wall of the container 10, securely to hold the rim 19 in place, an annular shoulder 23 adjacent the root end of stem 15 abutting against the periphery of port 11 to prevent cutting of the rim 19 of the bladder by excesive tightening of nut 21.

Extending from the under surface of the disc 16, axially aligned with stem 15, is a nipple or core 24 preferably an integral part of the fitting 14 and which is encompassed by and to which is secured, one end of a tightly wound coil spring 25, which extends axially of the bladder and is illustratively formed from wire that is circular in cross-section as shown in FIG. 1a.

To permit introduction of fluid into the bladder, an axial bore 26 extends through the stem 15, the nipple 24 and the intervening disc 16, the nipple 24 desirably having a plurality of lateral passageways 27 therethrough to enhance the flow of fluid into the bladder 13, a valve (not shown) being provided at the outer end of bore 26 to control the flow of fluid therethrough.

The length of the coil spring 25 is such that it illustratively extends almost the entire length of the bladder 13 and the free end 28 of the spring encompasses the reduced diameter portion 29 of a plug 31, the head 32 of which is desirably rounded and covered with resilient material as at 33.

The port 12 of the pressure vessel is desirably controlled by a suitable poppet valve 34 the spring urged valve head 35 of which, is adapted to be engaged by the bladder 13 for closure of said valve.

In the operation of the unit shown in FIG. 1, a fluid such as gas under pressure is introduced through bore 26 to charge the bladder 13 which will expand to engage the wall of the container 10, the gas flowing through the spaces between the convolutions of the coil spring 25.

A fluid such as oil under pressure is forced into the container 10 through port 12, further to compress the gas in the bladder. In use of the charged unit, when a valve (not shown) in a line connected to port 12 is opened, the bladder will expand to force the fluid in the container out of the latter and when substantially all of the fluid has been expelled, the expanded bladder will engage the valve head 35 to close the latter to prevent extrusion of the bladder.

When the bladder 13 is compressed by the introduction of oil under pressure through port 12, in the absence of the central guide or spring 25, it would tend to form folds and sharp creases which might cause rupture of the bladder. In addition as the bladder would be floating in the incompressible oil, it might rub against the wall of the container with resultant rupture.

By reason of the central guide or coil spring 25, sharp folds in the compressed bladder are substantially precluded and in addition the bladder will be retained away from the container wall.

It is of course to be understood that the cores 24 and 76 shown in FIG. 1 could be solid rather than hollow as shown at 90 in FIGS. 1b and c and could have longitudinal grooves 90' or be polygonal for example as at 90" to permit ready flow of fluid along the length of the core inwardly of the encompassing core spring 25', 25".

As many changes could be made in the above constructions, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A pressure vessel comprising a rigid container having a deformable partition therein defining two chambers for fluid, each having a fluid passageway leading thereinto, a flexible closely wound coil spring defining a central guide member for said partition in one of said chambers, said closely wound coil spring having adjacent convolutions substantially in engagement and being encompassed by said partition and having a substantially continuous surface with respect to said partition to restrain passage therethrough of the partition, said surface permitting passage therethrough of the fluid flowing through one of said fluid passageways, at least a portion of said coil spring being movable from its central position toward the wall of said container.

2. The combination set forth in claim 1 in which said guide member has a core extending at least a portion of the length thereof.

3. The combination set forth in claim 1 in which a rounded plug is secured to the free end of said coil spring.

4. The combination set forth in claim 1 in which each of the convolutions of the spring is rectangular in cross section and has rounded edges.

5. The combination set forth in claim 1 in which said guide member has a core extending at least a portion of the length thereof, said core has a bore therethrough and passageways lead into said bore.

6. The combination set forth in claim 1 in which the partition is a bladder having a mouth secured to said container, the guide member is secured at one end with respect to the container and extends axially of the bladder toward the free end thereof, with the free end of the guide member being spaced from the free end of the bladder.

References Cited in the file of this patent

UNITED STATES PATENTS

| | | |
|---|---|---|
| 2,738,227 | Havens | Mar. 13, 1956 |
| 2,760,518 | Peet | Aug. 28, 1956 |
| 2,791,969 | Berliner | May 14, 1957 |

FOREIGN PATENTS

| | | |
|---|---|---|
| 989,742 | France | May 30, 1951 |